(12) United States Patent
Yen

(10) Patent No.: US 8,831,076 B2
(45) Date of Patent: Sep. 9, 2014

(54) TRANSCEIVER IQ CALIBRATION SYSTEM AND ASSOCIATED METHOD

(75) Inventor: Shih-Chieh Yen, Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 106 days.

(21) Appl. No.: 13/490,773

(22) Filed: Jun. 7, 2012

(65) Prior Publication Data

US 2013/0223489 A1 Aug. 29, 2013

(30) Foreign Application Priority Data

Feb. 29, 2012 (TW) .............................. 101106599 A

(51) Int. Cl.
*H04B 1/38* (2006.01)
*H04L 5/16* (2006.01)

(52) U.S. Cl.
USPC ........................................................ 375/221

(58) Field of Classification Search
USPC ................................. 375/221, 219; 455/67.11
See application file for complete search history.

(56) References Cited

U.S. PATENT DOCUMENTS

| 7,181,205 | B1 * | 2/2007 | Scott et al. ..................... 455/423 |
| 2007/0189371 | A1 * | 8/2007 | Yen .............................. 375/219 |

\* cited by examiner

*Primary Examiner* — Chieh M Fan
*Assistant Examiner* — Wednel Cadeau
(74) *Attorney, Agent, or Firm* — Edell, Shapiro & Finnan, LLC

(57) ABSTRACT

A transceiver in-phase and quadrature (IQ) calibration method is provided. When calibrating the transceiver, an adjusting unit is connected to an output terminal of a transmitter to receive a first radio-frequency (RF) signal. The adjusting unit adjusts a phase delay of the first RF signal to generate a second RF signal to be inputted to an input terminal of a receiver. Through adjusting the phase delay of the first RF signal, both the transmitter and the receiver can be calibrated at the same time.

10 Claims, 7 Drawing Sheets

TRANSCEIVER IQ CALIBRATION SYSTEM AND ASSOCIATED METHOD

This application claims the benefit of Taiwan application Serial No. 101106599, filed Feb. 29, 2012, the subject matter of which is incorporated herein by reference.

BACKGROUND OF THE INVENTION

1. Field of the Invention

The invention relates to a transceiver, and more particularly, to a transceiver in-phase and quadrature (IQ) calibration system and associated method.

2. Description of the Related Art

A quadrature amplitude modulation (QAM) mode transceiver includes a transmitter and a receiver. The transmitter up-converts an in-phase (I) signal and a quadrature (Q) signal to a radio-frequency (RF) signal. The receiver receives the RF signal, and down-converts the RF signal to the I signal and the Q signal. Taking a 4QAM mode transmitter for example, the I signal and the Q signal are low-frequency signals having the same amplitude with a 90-degree phase difference.

The up-conversion from I and Q signals to an RF signal and the down-conversion from an RF signal to I and Q signals are performed by analog mixers. However, variables in the analog mixers lead to distortions and mismatches between the I and Q signals to further incur I/Q imbalance.

For example, an I channel and a Q channel in the transmitter respectively include a mixer, and the two mixers receive a pair of oscillation signals generated by a local oscillator (LO). When a phase difference between the pair of oscillation signals is not 90 degrees, a phase mismatch between the I and Q signals is incurred leading to a phase imbalance. Further, in the event that the I and Q channels adopt different circuit components, an amplitude mismatch between the I and Q signals is also incurred leading to a gain imbalance. Similarly, the receiver also suffers from the I/O imbalance due to the mismatch between the I and Q signals caused by the variables.

The amplitude imbalance in the RF signal of the transmitter degrades an error vector magnitude (EVM), and the phase imbalance misleads the receiver to treat the mismatched I and Q signals as correct signals. Therefore, to eliminate the overall I/Q imbalance, a calibration to the I and Q signals needs to be first performed in the transceiver.

In a conventional transceiver calibration method, either the transmitter or the receiver is first calibrated. For example, the relationship between the I and Q signals in the transmitter is first calibrated so that the mismatch between the I and Q signals in the transmitter is minimized. After calibrating the transmitter, the calibrated RF signal or an RF signal generated by an external tone generator is transmitted to the receiver to calibrate the receiver.

As noted, the above conventional calibration method involves an external signal source and other hardware devices. However, such components cannot be easily integrated with a system-on-chip (SoC).

SUMMARY OF THE INVENTION

The invention is directed to a transceiver in-phase and quadrature (IQ) calibration system and associated method. When calibrating the transceiver, an adjusting unit is connected between an output terminal of a transmitter and an input terminal of a receiver, and the transmitter and the receiver are simultaneously calibrated through adjusting a phase of a radio-frequency (RF) signal.

According to the present invention, a transceiver IQ calibration method is provided. The transceiver includes a transmitter and a receiver. The transmitter transmits a first RF signal according to a first in-phase (I) signal and a first quadrature (Q) signal. The receiver receives a second RF signal and generates a second I signal and a second Q signal. The calibration method includes steps of: adjusting the first I signal, the first Q signal and a phase delay to obtain a first amplitude variable associated with the transmitter and a second amplitude variable associated with the receiver, the phase delay being associated with the first RF signal of the transmitter and the second RF signal of the receiver; tuning the transceiver according to the first amplitude variable and the second amplitude variable such that the first I signal and the first Q signal as well as the second I signal and the second Q signal are matched in amplitude; adjusting the first I signal, the first Q signal and the phase delay to obtain a first phase variable associated with the transmitter and a second phase variable associated with the receiver; and tuning the receiver according to the first phase variable and the second phase variable such that the first I signal and the first Q signal as well as the second I signal and the second Q signal are matched in phase.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
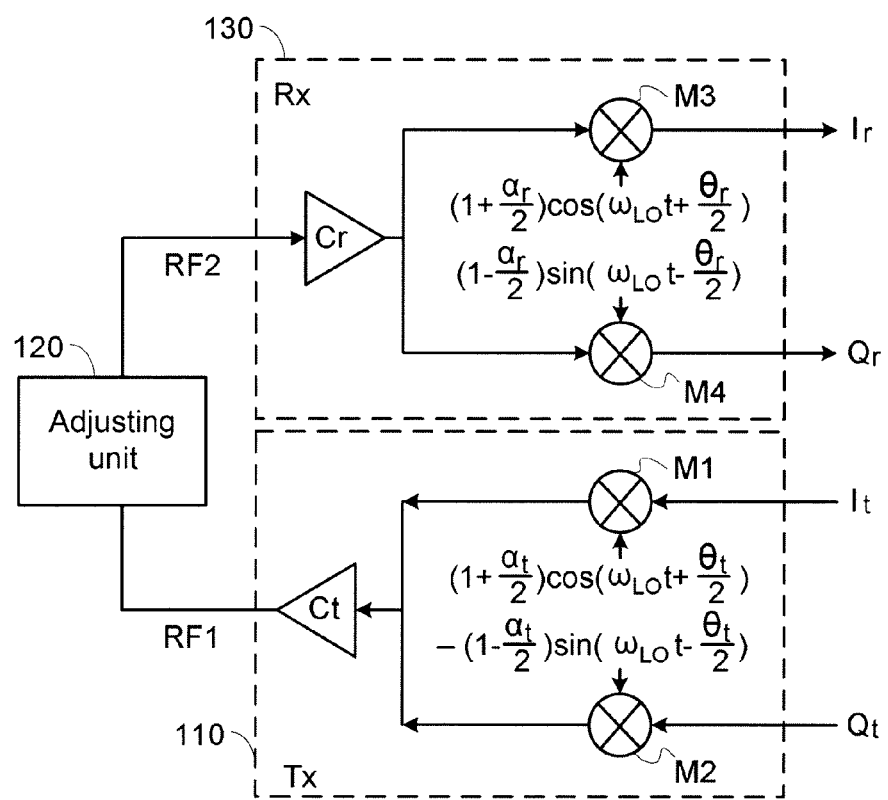
FIG. 1 is a schematic diagram of a transceiver in-phase and quadrature (IQ) calibration system according to one embodiment of the present invention.

FIG. 1 shows a schematic diagram of an in-phase and quadrature (IQ) calibration system of a transceiver according to one embodiment of the present invention. The system can be integrated with a system on a chip (SoC). The system includes a transmitter 110, a receiver 130 and an adjusting unit 120. The transmitter 110 and the receiver 130 form a transceiver. When performing IQ calibration on the transceiver, the adjusting unit 120 is connected between an output terminal of the transmitter 110 and an input terminal of the receiver 130.

In an in-phase (I) channel of the transmitter 110, a first mixer M1 receives and up-converts an I signal $I_t$. In a quadrature (Q) channel of the transmitter 110, a second mixer M2 receives and up-converts a Q signal O. A radio-frequency (RF) transmitter (Tx) Ct combines the up-converted I signal $I_t$ and Q signal $Q_t$ to generate a first RF signal RF1. Assume that a pair of oscillation signals respectively received by the first mixer M1 and the second mixer M2 are $$\left[\left(1+\frac{\alpha_t}{2}\right)\cos\left(\omega_{LO}t+\frac{\theta_t}{2}\right)\right] \text{ and } \left[-\left(1-\frac{\alpha_t}{2}\right)\sin\left(\omega_{LO}t-\frac{\theta_t}{2}\right)\right].$$

It is apparent that, an amplitude difference $\alpha_t$ between the pair of oscillation signals causes an amplitude mismatch between the I signal $I_t$ and the Q signal $Q_t$. Further, a discrepancy between a phase difference $(\pi/2+\theta_t)$ of the pair of oscillation signals and an ideal phase difference $\pi/2$ also leads to a phase mismatch between the I signal $I_t$ and the Q signal $Q_t$.

In the receiver (Rx) 130, an RF receiver (Rx) Cr receives a second RF signal RF2, and down-converts the RF signal RF2 by a third mixer M3 to an I signal $I_r$ in a I channel and down-converts the RF signal RF2 by a fourth mixer M4 to a Q signal $Q_r$ in a Q channel. In the down-conversion of the third mixer M3 and the fourth mixer M4, a low-pass filter is respectively needed for removing high-frequency signals in the I channel and the Q channel. Assume that a pair of oscillation signals respectively received by the third mixer M3 and the fourth mixer M4 are $$\left[\left(1+\frac{\alpha_r}{2}\right)\cos\left(\omega_{LO}t+\frac{\theta_r}{2}\right)\right]$$

and $$\left[\left(1-\frac{\alpha_r}{2}\right)\sin\left(\omega_{LO}t-\frac{\theta_r}{2}\right)\right].$$

It is apparent that, an amplitude difference $\alpha_r$ between the pair of oscillation signals causes an amplitude mismatch between the I signal $I_r$ and the Q signal $Q_r$. Further, the phase difference $(\pi/2+\theta_r)$ between the pair of oscillation signals also causes a phase mismatch between the I signal $I_r$ and the Q signal $Q_r$.

According to one embodiment of the present invention, when performing IQ calibration on the transceiver, the adjusting unit 120 is connected between an output terminal of the transmitter 110 and an input terminal of the receiver 130. The adjusting unit 120 receives the first RF signal RF1, and adjusts the phase of the first RF signal RF1 with a variable phase delay $\theta_d$ to generate the second RF signal RF2. By measuring a relationship between the I signal $I_r$ and the Q signal $Q_r$ generated under different phase delays $\theta_d$, the above variables $\alpha_t$, $\alpha_r$, $\theta_t$ and $\theta_r$ can be obtained to accordingly compensate the I signals I and the Q signals Q of the transmitter (Tx) 110 and the receiver (Rx) 130, thereby overcoming the I/Q imbalance. Relationships among the signals in the transceiver are described as follows.

The I signal $I_t$ and the Q signal $Q_t$ of the input terminal of the transmitter (Tx) 110 have a phase difference of 90 degrees, and can be expressed as:

$I_t = a\cos(\omega_s t+\theta_s)$ $Q_t = b\sin(\omega_s t+\theta_s)$

The first RF signal RF1 is expressed as:

$$RF1 = a\left(1+\frac{\alpha_t}{2}\right)\cos\left(\omega_{LO}t+\frac{\theta_t}{2}\right)\cos(\omega_s t+\theta_s) -$$

$$b\left(1-\frac{\alpha_t}{2}\right)\sin\left(\omega_{LO}t-\frac{\theta_t}{2}\right)\sin(\omega_s t+\theta_s)$$

$$= a\left(1+\frac{\alpha_t}{2}\right)\left[\cos\left(\omega_{LO}t+\omega_s t+\theta_s+\frac{\theta_t}{2}\right)+\cos\left(\omega_{LO}t-\omega_s t-\theta_s+\frac{\theta_t}{2}\right)\right] +$$

$$b\left(1-\frac{\alpha_t}{2}\right)\left[\cos\left(\omega_{LO}t+\omega_s t+\theta_s-\frac{\theta_t}{2}\right)-\cos\left(\omega_{LO}t-\omega_s t-\theta_s-\frac{\theta_t}{2}\right)\right]$$

The first RF signal RF1 is delayed by a phase delay $\theta_d$ to generate the second RF signal RF2, which is as:

$$RF2 = a\left(1+\frac{\alpha_t}{2}\right)\Big[$$
$$\cos\left(\omega_{LO}t+\omega_s t+\theta_s+\frac{\theta_t}{2}-\theta_d\right)+\cos\left(\omega_{LO}t-\omega_s t-\theta_s+\frac{\theta_t}{2}-\theta_d\right)\Big] +$$
$$b\left(1-\frac{\alpha_t}{2}\right)\Big[\cos\left(\omega_{LO}t+\omega_s t+\theta_s-\frac{\theta_t}{2}-\theta_d\right) -$$
$$\cos\left(\omega_{LO}t-\omega_s t-\theta_s-\frac{\theta_t}{2}-\theta_d\right)\Big]$$

When the input terminal of the receiver (Rx) 130 receives the second RF signal RF2, the RF signal RF2 is down-converted by the mixers and filtered by the low-pass filters to form the I signal $I_r$ and the Q signal $Q_r$:

$$I_r = LPF\Big\{\Big\{a\left(1+\frac{\alpha_t}{2}\right)\Big[\cos\left(\omega_{LO}t+\omega_s t+\theta_s+\frac{\theta_t}{2}-\theta_d\right) +$$
$$\cos\left(\omega_{LO}t-\omega_s t-\theta_s+\frac{\theta_t}{2}-\theta_d\right)\Big] +$$
$$b\left(1-\frac{\alpha_t}{2}\right)\Big[\cos\left(\omega_{LO}t+\omega_s t+\theta_s-\frac{\theta_t}{2}-\theta_d\right) -$$
$$\cos\left(\omega_{LO}t-\omega_s t-\theta_s-\frac{\theta_t}{2}-\theta_d\right)\Big]\Big\} \times$$
$$\left(1+\frac{\alpha_r}{2}\right)\cos\left(\omega_{LO}t+\frac{\theta_r}{2}\right)\Big\} =$$
$$a\left(1+\frac{\alpha_t}{2}\right)\left(1-\frac{\alpha_r}{2}\right)\cos\left(\theta_d-\frac{\theta_t}{2}+\frac{\theta_r}{2}\right)\cos(\omega_s t+\theta_s) +$$
$$b\left(1-\frac{\alpha_t}{2}\right)\left(1+\frac{\alpha_r}{2}\right)\sin\left(\theta_d+\frac{\theta_t}{2}+\frac{\theta_r}{2}\right)\sin(\omega_s t+\theta_s)$$

$$Q_r = LPF\Big\{\Big\{a\left(1+\frac{\alpha_t}{2}\right)\Big[\cos\left(\omega_{LO}t+\omega_s t+\theta_s+\frac{\theta_t}{2}-\theta_d\right) +$$
$$\cos\left(\omega_{LO}t-\omega_s t-\theta_s+\frac{\theta_t}{2}-\theta_d\right)\Big] +$$
$$b\left(1-\frac{\alpha_t}{2}\right)\Big[\cos\left(\omega_{LO}t+\omega_s t+\theta_s-\frac{\theta_t}{2}-\theta_d\right) -$$
$$\cos\left(\omega_{LO}t-\omega_s t-\theta_s-\frac{\theta_t}{2}-\theta_d\right)\Big]\Big\} \times$$
$$\left(1-\frac{\alpha_r}{2}\right)\sin\left(\omega_{LO}t-\frac{\theta_r}{2}\right)\Big\} = a\left(1+\frac{\alpha_t}{2}\right)\left(1-\frac{\alpha_r}{2}\right)$$
$$\sin\left(\theta_d-\frac{\theta_t}{2}-\frac{\theta_r}{2}\right)\cos(\omega_s t+\theta_s) +$$
$$b\left(1-\frac{\alpha_t}{2}\right)\left(1-\frac{\alpha_r}{2}\right)\cos\left(\theta_d+\frac{\theta_t}{2}-\frac{\theta_r}{2}\right)\sin(\omega_s t+\theta_s)$$

According to the above relationships, the IQ calibration method according to one embodiment of the present invention includes the following steps.

First, only the I signal $I_t$ is provided to the transmitter (Tx) 110. At this point, the transmitter 110 receives the I signal $I_t$ but not the Q signal $Q_t$. That is, a=1 and b=0. Next, the phase delay $\theta_d$ is adjusted by the adjusting unit 120, and the amplitudes of the I signal $I_r$ and the Q signal $Q_r$ generated by the receiver (Rx) 130 are measured.

For $a = 1$ and $b = 0$, when $\theta_d = \theta_{d1} = \frac{\pi}{2} + \frac{\theta_t}{2} - \frac{\theta_r}{2}$, $I_{r(a,b)}(\theta_{d1}) = I_{r(1,0)}(\theta_{d1}) = 0$; and $Q_{r(a,b)}(\theta_{d1}) = Q_{r(1,0)}(\theta_{d1}) = A_{d1}\left(1 + \frac{\alpha_t}{2}\right)\left(1 - \frac{\alpha_r}{2}\right)\cos(\theta_r)$.

In the above, $A_{d1}$ is a difference between an actual value and an ideal value of $Q_{r(1,0)}(\theta_{d1})$. Influence of $A_{d1}$ upon $Q_{r(a,b)}(\theta_{d1})$ will be eliminated due to other calculations in subsequent steps.

Similarly, for $a = 1$ and $b = 0$, when $\theta_d = \theta_{d2} = \frac{\theta_t}{2} + \frac{\theta_r}{2}$ $Q_{r(a,b)}(\theta_{d2}) = Q_{r(1,0)}(\theta_{d2}) = 0$; and $I_{r(a,b)}(\theta_{d2}) = I_{r(1,0)}(\theta_{d2}) = A_{d2}\left(1 + \frac{\alpha_t}{2}\right)\left(1 + \frac{\alpha_r}{2}\right)\cos(\theta_r)$.

In the above, $A_{d2}$ is a difference between an actual value and an ideal value of $I_{r(1,0)}(\theta_{d2})$. Influence of $A_{d2}$ upon $I_{r(a,b)}(\theta_{d2})$ will be eliminated due to other calculations in subsequent steps.

Figure 2A:
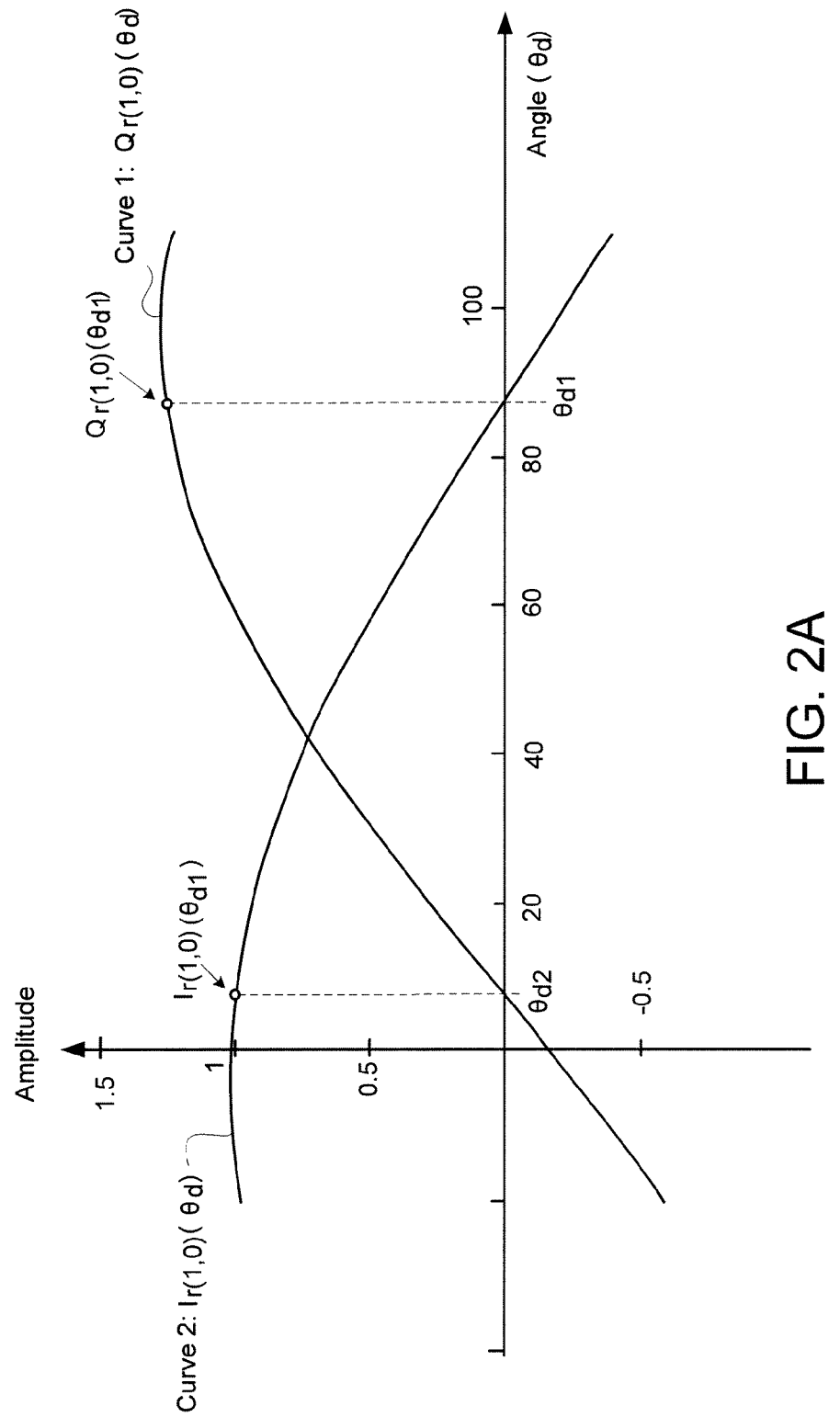
FIG. 2A is a plot of a relationship of an I signal $I_r$ and a Q signal $Q_r$ generated by a receiver Rx with a phase delay $\theta_d$ when calibration is performed on a transceiver and a transmitter Tx only receives an I signal $I_t$.

FIG. 2A shows a plot of a relationship of the I signal $I_r$ and the Q signal $Q_r$ generated by the receiver (Rx) 130 with the phase delay $\theta_d$ when the calibration is performed on the transceiver and the transmitter (Tx) 110 only receives the I signal $I_t$. When a=1 and b=0, a curve 1 represents a relationship between the Q signal $Q_r$ of the receiver (Rx) 130 and the phase delay $\theta_d$, and a curve 2 represents a relationship between the I signal $I_r$ of the receiver (Rx) 130 and the phase delay $\theta_d$.

According to one embodiment of the present invention, for a=1 and b=0, by adjusting the phase delay to $\theta_{d1}$, the I signal $I_r$ reaches a minimum amplitude (i.e., zero amplitude) and the amplitude of the Q signal $Q_r$ at this point is obtained and recorded as a first Q amplitude value of $Q_{r(1,0)}(\theta_{d1}) = A_{d1}\left(1 + \frac{\alpha_t}{2}\right)\left(1 - \frac{\alpha_r}{2}\right)\cos(\theta_r)$.

Next, by adjusting the phase delay to $\theta_{d2}$, the Q signal $Q_r$ reaches a minimum amplitude (i.e., zero amplitude) and the I signal $I_r$ at this point is obtained and recorded as a first I amplitude value of $I_{r(1,0)}(\theta_{d2}) = A_{d2}\left(1 + \frac{\alpha_t}{2}\right)\left(1 + \frac{\alpha_r}{2}\right)\cos(\theta_r)$.

Next, only the Q signal $Q_t$ is provided to the transmitter (Tx) 110. At this point, the transmitter (Tx) 110 receives the Q signal $Q_t$ but not the I signal $I_t$. That is, a=0 and b=1. The phase delay $\theta_d$ is adjusted by the adjusting unit 120, and the amplitudes of the I signal $I_r$ and the Q signal $Q_r$ generated by the receiver (Rx) 130 are measured.

For $a = 0$ and $b = 1$, when $\theta_d = \theta_{d3} = -\frac{\theta_t}{2} - \frac{\theta_r}{2}$, $I_{r(a,b)}(\theta_{d3}) = I_{r(0,1)}(\theta_{d3}) = 0$; and $Q_{r(a,b)}(\theta_{d3}) = Q_{r(0,1)}(\theta_{d3}) = A_{d3}\left(1 - \frac{\alpha_t}{2}\right)\left(1 - \frac{\alpha_r}{2}\right)\cos(\theta_r)$.

Where $A_{d3}$ is a difference between an actual value and an ideal value of $Q_{r(0,1)}(\theta_{d3})$. Influence of $A_{d3}$ upon $Q_{r(a,b)}(\theta_{d3})$ shall be eliminated due to other calculations in subsequent steps.

Similarly, for $a = 0$ and $b = 1$, when $\theta_d = \theta_{d4} = \frac{\pi}{2} - \frac{\theta_t}{2} + \frac{\theta_r}{2}$ $Q_{r(a,b)}(\theta_{d4}) = Q_{r(0,1)}(\theta_{d4}) = 0$; and $I_{r(a,b)}(\theta_{d4}) = I_{r(0,1)}(\theta_{d4}) = A_{d4}\left(1 - \frac{\alpha_t}{2}\right)\left(1 + \frac{\alpha_r}{2}\right)\cos(\theta_r)$.

Where $A_{d4}$ is a difference between an actual value and a ideal value of $I_{r(0,1)}(\theta_{d4})$. Influence of $A_{d4}$ upon $I_{r(a,b)}(\theta_{d4})$ shall be eliminated due to other calculations in subsequent steps.

Figure 2B:
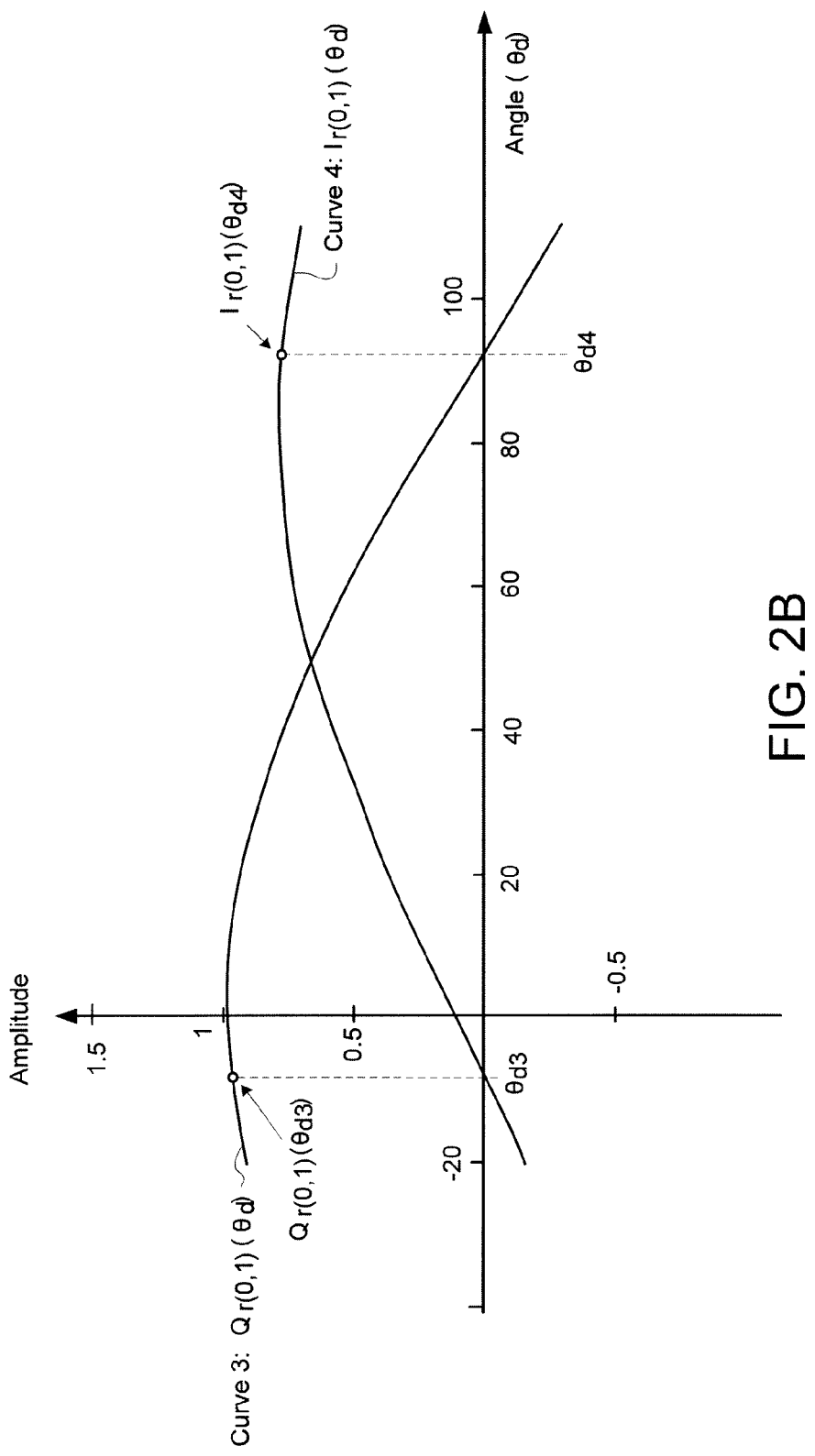
FIG. 2B is a plot of a relationship of an I signal $I_r$ and a Q signal $Q_r$ generated by a receiver Rx with a phase delay $\theta_d$ when calibration is performed on a transceiver and a transmitter Tx only receives a Q signal $Q_t$.

FIG. 2B shows a plot of a relationship of the I signal $I_r$ and the Q signal $Q_r$ generated by the receiver (Rx) 130 with the phase delay $\theta_d$ when the calibration is performed on the transceiver and the transmitter (Tx) 110 only receives the Q signal $Q_t$. When a=0 and b=1, a curve 3 represents a relationship between the Q signal $Q_r$ of the receiver Rx and the phase delay $\theta_d$, and a curve 4 represents a relationship between the I signal $I_r$ of the receiver Rx and the phase delay $\theta_d$.

According to one embodiment of the present invention, for a=0 and b=1, by adjusting the phase delay to $\theta_{d3}$, the I signal $I_r$ reaches the minimum amplitude (i.e., zero amplitude) and an amplitude of the Q signal $Q_r$ at this point obtained and recorded as a second Q amplitude value of $Q_{r(0,1)}(\theta_{d3}) = A_{d3}\left(1 - \frac{\alpha_t}{2}\right)\left(1 - \frac{\alpha_r}{2}\right)\cos(\theta_r)$.

Next, by adjusting the phase delay to $\theta_{d4}$, the Q signal $Q_r$ reaches the minimum amplitude (i.e., zero amplitude) and an amplitude of the I signal $I_r$ at this point is obtained and recorded as a second I amplitude value of $I_{r(0,1)}(\theta_{d4}) = A_{d4}\left(1 - \frac{\alpha_t}{2}\right)\left(1 + \frac{\alpha_r}{2}\right)\cos(\theta_r)$.

Since $\theta_t$ and $\theta_r$ possess extremely small values, the angles $\theta_{d1}$ and $\theta_{d4}$ approximate 90 degrees ($\pi/2$), and the angles $\theta_{d2}$ and $\theta_{d3}$ approximate 0 degree. Further, $A_{d1}$ approximates $A_{d4}$, and $A_{d2}$ approximates $A_{d3}$. Thus, after completing the above steps, the variables $\alpha_t, \alpha_r, \theta_t$ and $\theta_r$ can be obtained according to the above relationships.

According to one embodiment of the present invention, the first amplitude variable $\alpha_t$ can be obtained as a multiplication of the first Q amplitude value divided by the second Q amplitude value and the first I amplitude value divided by the second I amplitude value, i.e.:

$$\frac{Q_{r(1,0)}(\theta_{d1})}{Q_{r(0,1)}(\theta_{d3})} \cdot \frac{I_{r(1,0)}(\theta_{d2})}{I_{r(0,1)}(\theta_{d4})} = \frac{A_{d1}\left(1+\frac{\alpha_t}{2}\right)\left(1-\frac{\alpha_r}{2}\right)\cos(\theta_r)}{A_{d3}\left(1-\frac{\alpha_t}{2}\right)\left(1-\frac{\alpha_r}{2}\right)\cos(\theta_r)} \cdot$$ (A)

$$\frac{A_{d2}\left(1+\frac{\alpha_t}{2}\right)\left(1+\frac{\alpha_r}{2}\right)\cos(\theta_r)}{A_{d4}\left(1-\frac{\alpha_t}{2}\right)\left(1+\frac{\alpha_r}{2}\right)\cos(\theta_r)}$$

$$= \frac{\left(1+\frac{\alpha_t}{2}\right)^2}{\left(1-\frac{\alpha_t}{2}\right)^2}$$

In other words, after obtaining the first Q amplitude value, the second Q amplitude value, the first I amplitude value and the second I amplitude value, the first amplitude variable $\alpha_t$ can be obtained through Equation (A).

Further, the second amplitude variable $\alpha_r$ can be obtained as a multiplication of the first I amplitude value divided by the first Q amplitude value and the second I amplitude value divided by the second Q amplitude value, i.e.:

$$\frac{I_{r(1,0)}(\theta_{d2})}{Q_{r(1,0)}(\theta_{d1})} \cdot \frac{I_{r(0,1)}(\theta_{d4})}{Q_{r(0,1)}(\theta_{d3})} = \frac{A_{d2}\left(1+\frac{\alpha_t}{2}\right)\left(1+\frac{\alpha_r}{2}\right)\cos(\theta_r)}{A_{d1}\left(1+\frac{\alpha_t}{2}\right)\left(1-\frac{\alpha_r}{2}\right)\cos(\theta_r)} \cdot$$ (B)

$$\frac{A_{d4}\left(1-\frac{\alpha_t}{2}\right)\left(1+\frac{\alpha_r}{2}\right)\cos(\theta_r)}{A_{d3}\left(1-\frac{\alpha_t}{2}\right)\left(1-\frac{\alpha_r}{2}\right)\cos(\theta_r)}$$

$$= \frac{\left(1+\frac{\alpha_r}{2}\right)^2}{\left(1-\frac{\alpha_r}{2}\right)^2}$$

In other words, after obtaining the first Q amplitude value, the second Q amplitude value, the first I amplitude value and the second I amplitude value, the second amplitude variable $\alpha_r$ can be obtained through Equation (B).

Upon confirming the first amplitude variable $\alpha_t$ of the transmitter 110 and the second amplitude variable $\alpha_r$ of the receiver 130, the transceiver may utilize the two variables to perform pre-compensation to calibrate the amplitude mismatch in the transmitter 110 and the receiver 130 in advance, thereby eliminating the amplitude imbalance. After eliminating the amplitude imbalance, only the remaining phase imbalance needs to be solved in the transceiver.

As the amplitude imbalance in the transceiver is eliminated, an I signal I'$_r$ and a Q signal Q'$_r$ generated by the receiver 130 are thus immune from the amplitude imbalance. Therefore, according to one embodiment of the present invention, a and b are again set as a=1 and b=0. That is, the transmitter 110 only receives the I signal I$_t$ but not the Q signal Q$_t$. The phase delay $\theta_d$ is adjusted to further obtain the first phase variable $\theta_t$ and the second phase variable $\theta_r$.

Figure 2C:
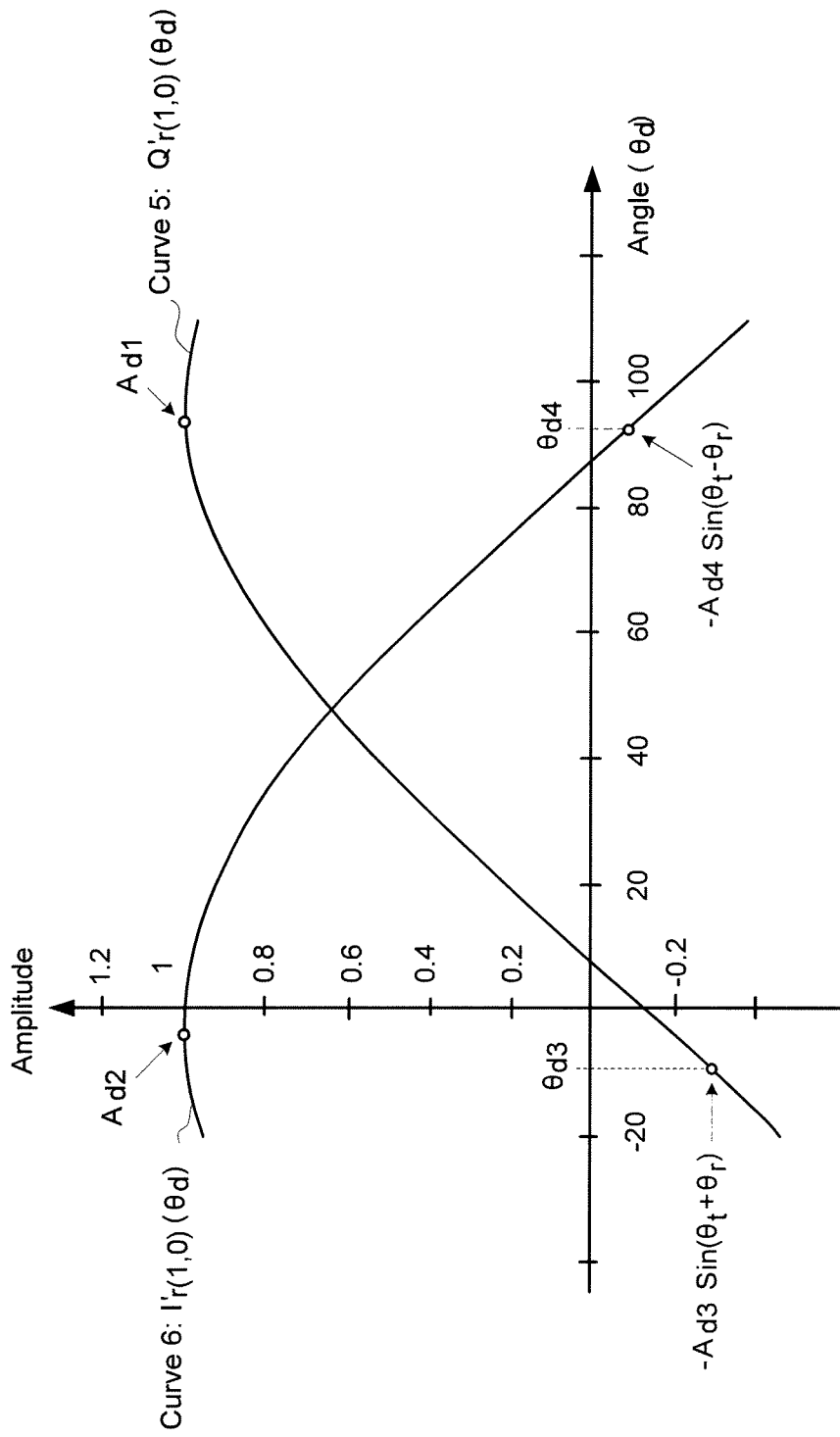
FIG. 2C is a plot of a relationship of an I signal $I'_r$ and a Q signal $Q'_r$ generated by a receiver Rx with a phase delay $\theta_d$ when a transmitter Tx in a transceiver only receives an I signal $I_t$ after the amplitude imbalance is eliminated.

FIG. 2C shows a plot of a relationship of the I signal I'$_r$ and the Q signal Q'$_r$ generated by the receiver (Rx) 130 with the phase delay $\theta_d$ when the transmitter (Tx) 110 in the transceiver only receives the I signal I$_t$ after the amplitude imbalance is eliminated. When a=1 and b=0, a curve 5 represents a relationship between the Q signal Q'$_r$ of the receiver Rx and the phase delay $\theta_d$, and a curve 6 represents a relationship between the I signal I'$_r$ of the receiver Rx and the phase delay $\theta_d$.

According to one embodiment of the present invention, for a=1 and b=0, the phase delay $\theta_d$ is adjusted to approximately 90 degrees ($\pi/2$), and a positive amplitude value of the Q signal Q'$_r$ at this point is obtained and recorded as a third Q amplitude value=$A_{d1}$. Further, the phase delay $\theta_d$ is adjusted to approximately 0 degree, and a positive amplitude value of the I signal I'$_r$ at this point is obtained and recorded as a third I amplitude value=$A_{d2}$.

Next, the phase delay $\theta_d$ is adjusted to $\theta_{d3}$, and a fourth Q amplitude value=$-A_{d3}\sin(\theta_t+\theta_r)$ of the Q signal Q'$_r$ is obtained; the phase delay $\theta_d$ is adjusted to $\theta_{d4}$, and a fourth I amplitude value=$-A_4\sin(\theta_t-\theta_r)$ of the I signal I'$_r$ is obtained.

According to one embodiment of the present invention, the first phase variable $\theta_t$ and the second phase variable $\theta_r$ in the transmitter 110 can be obtained according to results of the fourth Q amplitude value divided by the third I amplitude value and the fourth I amplitude value divided by the third Q amplitude value, i.e.:

$$\frac{Q'_{r(1,0)}(\theta_{d3})}{\max[I'_{r(1,0)}(\theta_d)]} = \frac{-A_{d3}\sin(\theta_t+\theta_r)}{A_{d2}} = -\sin(\theta_t+\theta_r)$$ (C)

$$\frac{I'_{r(1,0)}(\theta_{d4})}{\max[Q'_{r(1,0)}(\theta_d)]} = \frac{-A_{d4}\sin(\theta_t-\theta_r)}{A_{d1}} = -\sin(\theta_t-\theta_r)$$ (D)

In other words, upon obtaining the third I amplitude value, the third Q amplitude value, the fourth I amplitude value and the fourth Q amplitude value, the first phase variable $\theta_t$ and the second phase variable $\theta_r$ can be calculated according to Equations (C) and (D). Hence, according to the first phase variable $\theta_t$ and the second phase variable $\theta_r$, the phase mismatch in the transceiver can be calibrated to solve the phase imbalance and to complete all calibration steps of the present invention.

Figure 3A:
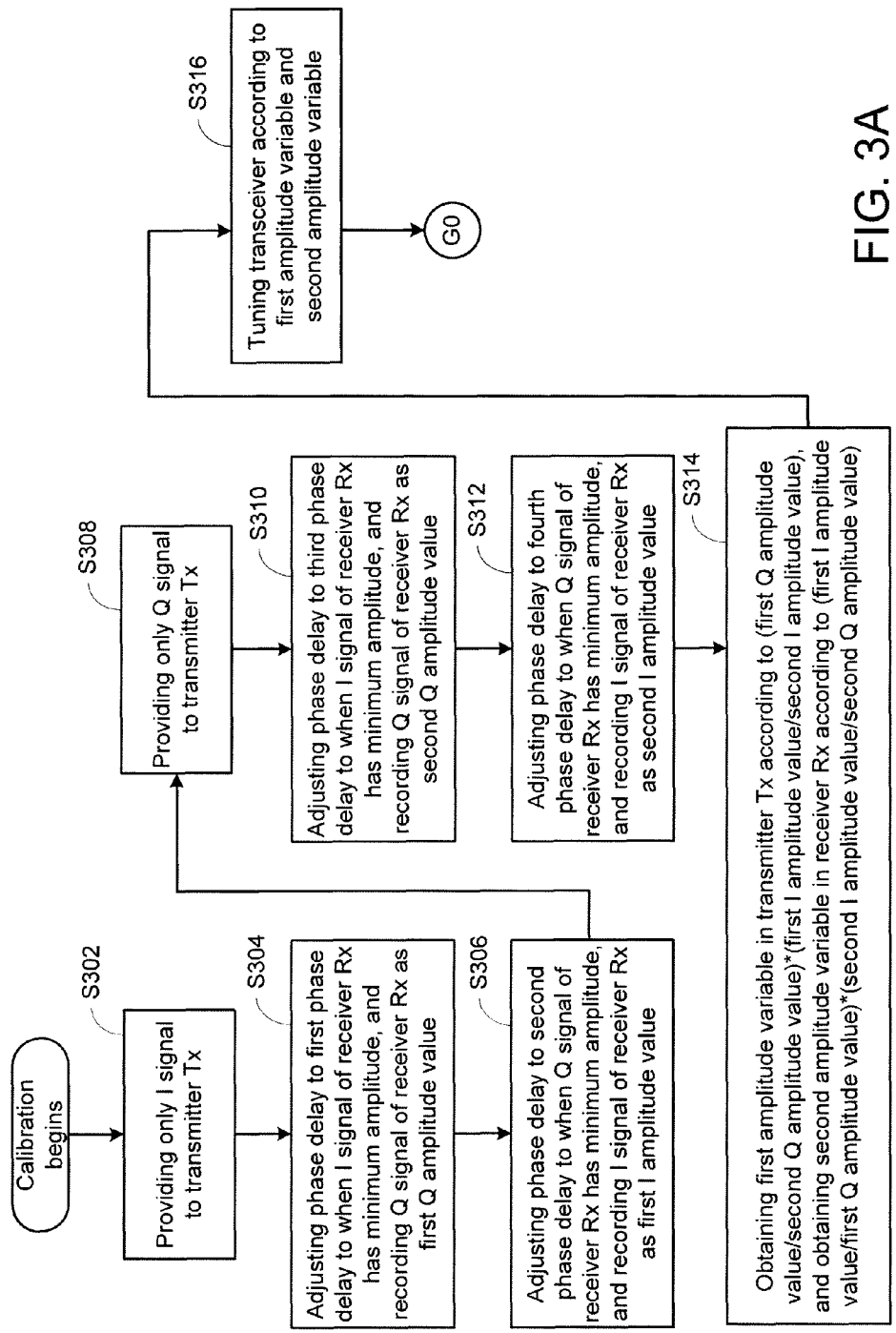
FIGS. 3A and 3B are a flowchart of a transceiver IQ calibration method according to one embodiment of the present invention.
Figure 3B:
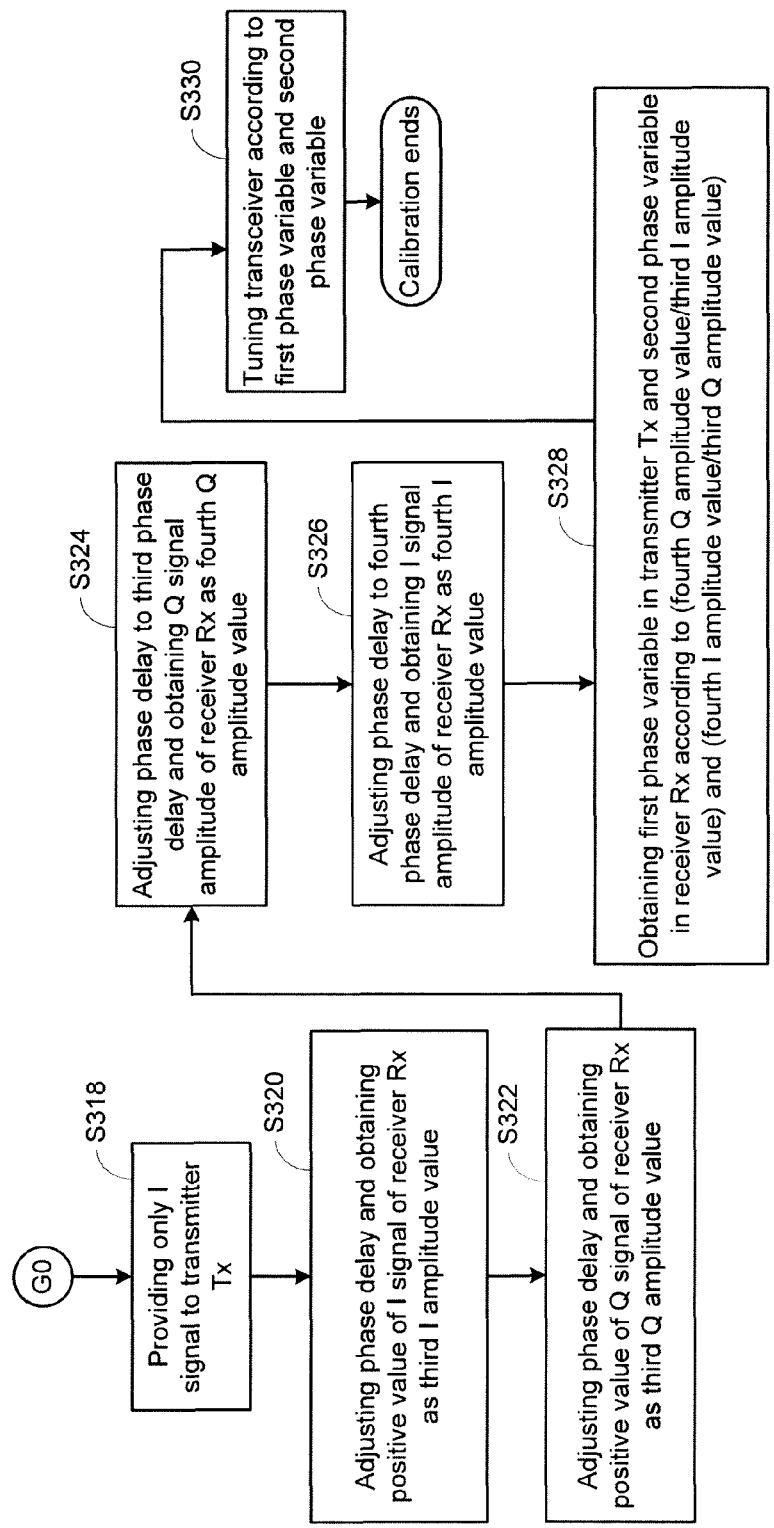

FIG. 3A and FIG. 3B show a flowchart of a transceiver IQ calibration method according to one embodiment of the present invention. In Step S302, as the calibration begins, only an I signal I$_t$ is provided to a transmitter (Tx). In Step S304, a phase delay is adjusted to a first phase delay $\theta_{d1}$. A this point, the I signal I$_r$ of the receiver Rx has a minimum amplitude, and the amplitude of the Q signal Q$_r$ of the receiver Rx is obtained and recorded as a first Q amplitude value. In Step S306, the phase delay is adjusted to a second phase delay $\theta_{d2}$. At this point, the Q signal Q$_r$ of the receiver Rx has a minimum amplitude, and the amplitude of the I signal I$_r$ of the receiver Rx is obtained and recorded as a first I amplitude value.

In Step S308, only a Q signal Q$_t$ is provided to the transmitter (Tx). In Step S310, the phase delay is adjusted to a third phase delay $\theta_{d3}$. At this point, the I signal I$_r$ of the receiver Rx has a minimum amplitude, and the amplitude of the Q signal Q$_r$ of the receiver Rx is obtained and recorded as a second Q amplitude value. In Step S312, the phase delay is adjusted to a fourth phase delay $\theta_{d4}$. At this point, the Q signal Q$_r$ of the receiver (Rx) has a minimum amplitude, and the amplitude of the I signal I$_r$ of the receiver (Rx) at this point is obtained and recorded as a second I amplitude value.

In Step S314, a ratio of the first Q amplitude value and the second Q amplitude value is multiplied by a ratio of the first I amplitude value and the second I amplitude value to obtain a first amplitude variable $\alpha_t$ in the transmitter Tx; a ratio of the first I amplitude value and the first Q amplitude value is multiplied by a ratio of the second I amplitude value and the second Q amplitude value to obtain the second amplitude variable $\alpha_r$ in the receiver (Rx).

In Step S316, the transceiver is tuned according to the first amplitude variable $\alpha_t$ and the second amplitude variable $\alpha_r$.

In Step S318, only the I signal $I_t$ is provided to the transmitter Tx. In Step S320, the phase delay is adjusted to obtain a positive maximum value of the I signal $I'_r$ of the receiver (Rx), and the obtained value is recorded as a third I amplitude value. In Step S322, the phase delay is adjusted to obtain a positive maximum value of the Q signal $Q'_r$ of the receiver (Rx), and the obtained value is recorded as a third Q amplitude value.

In Step S324, the phase delay is adjusted to the third phase delay $\theta_{d3}$, and the amplitude of the Q signal $Q'_r$ of the receiver Rx is obtained and recorded as a fourth Q amplitude value. In Step S326, the phase delay is adjusted to the fourth phase delay $\theta_{d4}$, and the amplitude of the I signal $I'_r$ of the receiver Rx is obtained and recorded as a fourth I amplitude value.

In Step S328, according to a ratio of the fourth Q amplitude value and the third I amplitude value as well as a ratio of the fourth I amplitude value and the third Q amplitude value, a first phase variable $\theta_t$ in the transmitter (Tx) and a second phase variable $\theta_r$ in the receiver (Rx) are obtained.

In Step 330, the transceiver is tuned according to the first phase variable $\theta_t$ and the second phase variable $\theta_r$, and the calibration ends.

It should be noted that, either setting a=1 and b=0 first, or setting a=0 and b=1 first is intended to be within the scope of the present invention. That is, the present invention is also achieved with Steps S308 to S312 being exchanged with Steps S302 to S306. In addition, after Step S330, it is further determined whether the calibration needs to be repeated according to the first amplitude variable $\alpha_t$, the second amplitude variable $\alpha_r$, the first phase variable $\theta_t$ and the second phase variable $\theta_r$. For example, the calibration ends when $(\alpha_t^2+\theta_t^2<th1)$ and $(\alpha_r^2+\theta_r^2<th2)$ are established. Conversely, when either $(\alpha_t^2+\theta_t^2<th1)$ or $(\alpha_r^2+\theta_r^2<th2)$ is not established, the method returns to Step S302 to continue the calibration. Wherein, th1 and th2 are predetermined thresholds set by a user.

It can be seen from the above embodiments that a transceiver IQ calibration system and associated method is provided. When calibrating the transceiver, the adjusting unit is connected between the output terminal of the transmitter and the input terminal of the receiver, and the phase and amplitude imbalances caused by innate defects of the transmitter and the receiver are at the same time calibrated through adjusting the phase of the RF signal.

Figure 4A:
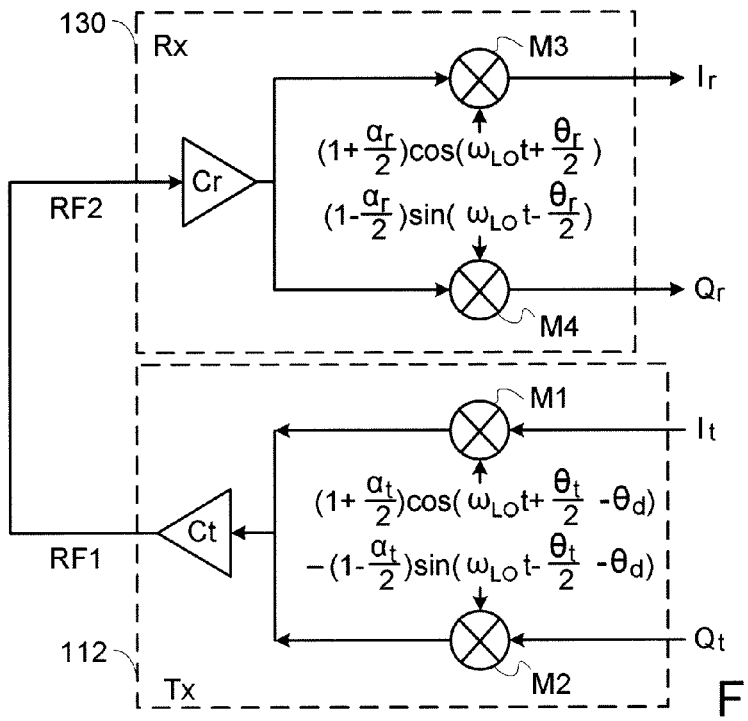
FIG. 4A is a calibration system according to another embodiment of the present invention.

Further, the adjusting unit of the present invention is not limited to being connected between a transmitter and a receiver. FIG. 4A shows a calibration system according to another embodiment of the present invention. Compared to the embodiment in FIG. 1, a main difference is that the adjusting unit in the calibration system in FIG. 4A is integrated to a local oscillator of a transmitter 112, so that the phase of the pair of oscillation signals in the transmitter 112 can be adjusted. Further, the output terminal of the transmitter is directly connected to the input terminal of the receiver 130, i.e., the first RF signal RF1 and the second RF signal RF2 are completely identical with no phase difference between the two. Similarly, the object of the present invention can still be achieved by the calibration method in FIGS. 3A and 3B.

Figure 4B:
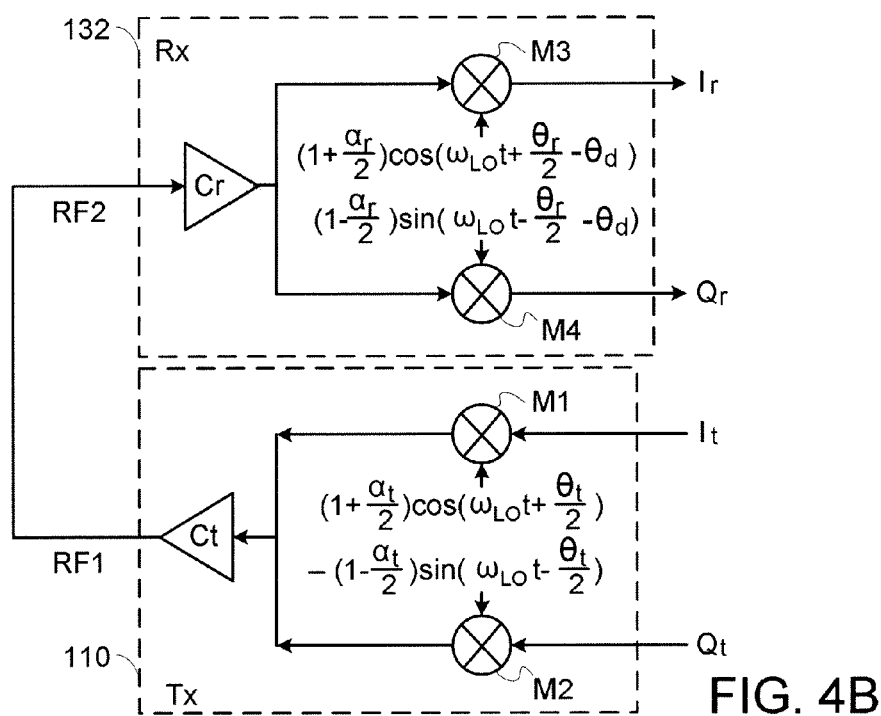
FIG. 4B is a calibration system according to yet another embodiment of the present invention.

FIG. 4B shows a calibration system according to yet another embodiment of the present invention. Compared to the embodiment in FIG. 1, a main difference is that the adjusting unit in the calibration system in FIG. 4B is integrated to a local oscillator of a receiver 132, so that the phase of the pair of oscillation signals in the receiver 132 can be adjusted. Further, the output terminal of the transmitter 110 is directly connected to the input terminal of the receiver 132, i.e., the first RF signal RF1 and the second RF signal RF2 are completely identical, with no phase difference between the two. Similarly, the object of the present invention can still be achieved by the calibration method in FIGS. 3A and 3B.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transceiver in-phase and quadrature (IQ) calibration method, the transceiver comprising a transmitter and a receiver, the transmitter transmitting a first radio-frequency (RF) signal according to a first in-phase (I) signal and a first quadrature (Q) signal, the receiver receiving a second RF signal and generating a second I signal and a second Q signal; the method comprising:

a) adjusting the first I signal, the first Q signal and a phase delay to obtain a first amplitude variable associated with the transmitter and a second amplitude variable associated with the receiver, wherein the phase delay is associated with a phase difference between the first RF signal and the second RF signal;
   b) tuning the transceiver according to the first amplitude variable and the second amplitude variable such that the first I signal and the first Q signal as well as the second I signal and the second Q signal are matched in amplitude;
   c) adjusting the first I signal, the first Q signal and the phase delay to obtain a first phase variable associated with the transmitter and a second phase variable associated with the receiver; and
   d) tuning the receiver according to the first phase variable and the second phase variable such that the first I signal and the first Q signal as well as the second I signal and the second Q signal are matched in phase,
   wherein step (a) comprises:
   a1) adjusting the first Q signal to zero;
   a2) adjusting the phase delay until when the second I signal has a minimum amplitude to set an amplitude of the second Q signal as a first Q amplitude value;
   a3) adjusting the phase delay until when the second Q signal has a minimum amplitude to set an amplitude of the second I signal as a first I amplitude value;
   wherein, the first Q amplitude value and the first I amplitude value relate to the first amplitude variable and the second amplitude variable.

2. The method according to claim 1, before step (a1) or after step (a3), further comprising:
   a4) adjusting the first I signal to zero;
   a5) adjusting the phase delay until when the second I signal has a minimum amplitude to set an amplitude of the second Q signal as a second Q amplitude value;
   a6) adjusting the phase delay until when the second Q signal has a minimum amplitude to obtain an amplitude of the second I signal as a second I amplitude value;
   wherein, the second Q amplitude value and the second I amplitude value relate to the first amplitude variable and the second amplitude variable.

3. The method according to claim 1, wherein step (c) comprises:
   c1) adjusting the first I signal to zero;
   c2) adjusting the phase delay until when the second I signal has a positive maximum value to obtain a third I amplitude value;

c3) adjusting the phase delay until when the second Q signal has a positive maximum value to obtain a third Q amplitude value;

c4) adjusting the phase delay to a predetermined first delay phase to obtain an amplitude of the second Q signal as a fourth Q amplitude value;

c5) adjusting the phase delay to a predetermined second delay phase to obtain an amplitude of the second I signal as a fourth I amplitude value; and c6) obtaining the first phase variable and the second phase variable according to the third I amplitude value, the third Q amplitude value, the fourth Q amplitude value and the fourth I amplitude value.

4. The method according to claim 1, after step (d), further comprising:

determining whether to iterate step (a) according to the first amplitude variable, the second amplitude variable, the first phase variable and the second phase variable.

5. The method according to claim 1, wherein the second RF signal is generated from delaying the first RF signal by the phase delay.

6. The method according to claim 1, wherein the phase delay is provided to a pair of oscillation signals, and the pair of oscillation signals are provided so that the first I signal and the first Q signal are up-converted to the first RF signal.

7. The method according to claim 1, wherein the phase delay is provided to a pair of oscillation signals, and the pair of oscillation signals are provided so that the first RF signal is down-converted to the second I signal and the second Q signal.

8. The method according to claim 2, wherein step (a) comprises obtaining the first amplitude variable by multiplying a ratio of the first Q amplitude value and the second Q amplitude value with a ratio of the first I amplitude value and the second I amplitude value, and obtaining the second amplitude variable by multiplying a ratio of the first I amplitude value and the first Q amplitude value with a ratio of the second I amplitude value and the second Q amplitude value.

9. The method according to claim 3, wherein the first phase delay is associated with a phase delay when the first I signal is zero, and the second I signal has a minimum amplitude and the second phase delay is associated with a phase delay when the first I signal is zero, and the second Q signal has a minimum amplitude.

10. The method according to claim 3, wherein step (c6) comprises obtaining the first phase variable and the second phase variable by utilizing a ratio of the fourth Q amplitude value and the third I amplitude value and a ratio of the fourth I amplitude value and the third Q amplitude value.

\* \* \* \* \*